Nov. 9, 1954  F. F. HANSEN  2,693,771
DOUGH PRESSURE BOARD
Filed Aug. 25, 1952
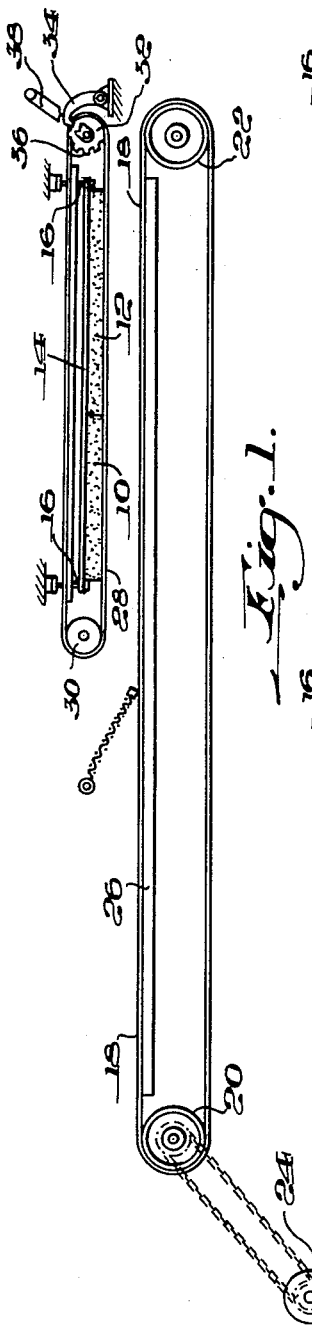
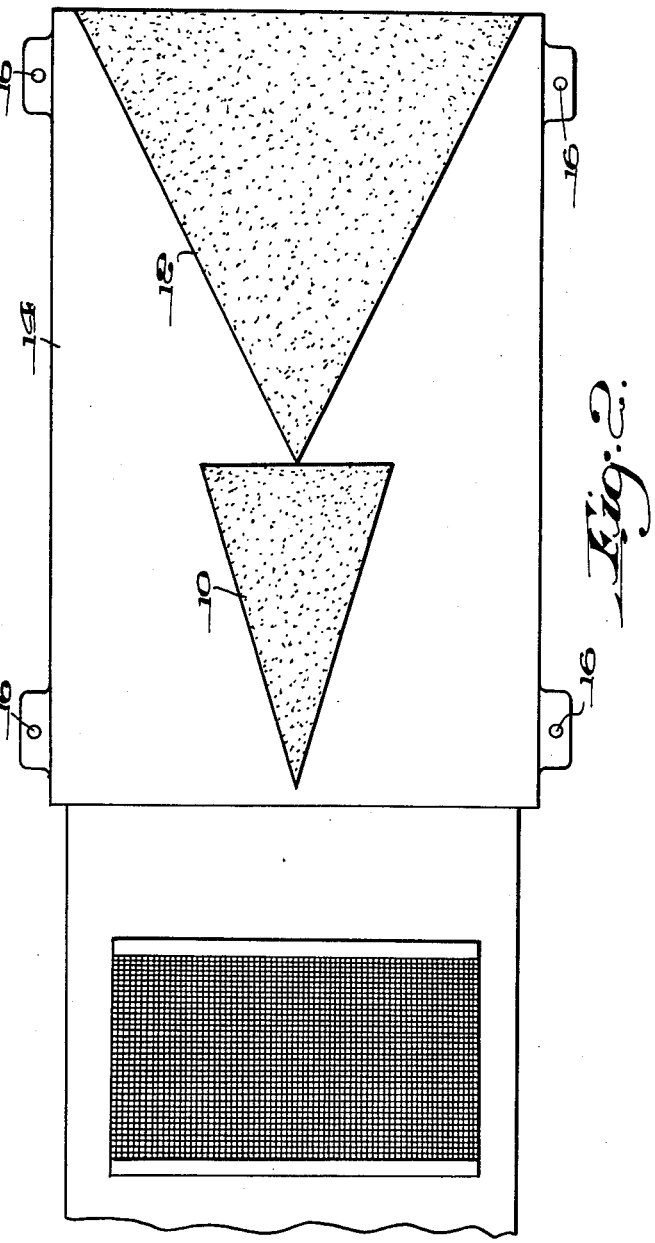
INVENTOR.
FRANCIS FREDERICK HANSEN.
BY
Christy, Parmelee and Strickland.
his ATTORNEYS.

United States Patent Office 2,693,771
Patented Nov. 9, 1954

2,693,771

DOUGH PRESSURE BOARD

Francis Frederick Hansen, Pittsburgh, Pa.

Application August 25, 1952, Serial No. 306,191

5 Claims. (Cl. 107—9)

This invention relates to bread dough moulding machines. More particularly the invention relates to pressure rolling of bread dough which has been sheeted and curled into a roll, and then rolled to expel entrained air to consolidate the dough to form a bread dough loaf in which the division lines of the strip from which the roll is formed have been removed.

Yeast rising bread dough is elastic and full of gas when it is measured to make bread loaves. The lumps of dough are sent to the moulding machine to be sheeted and formed into rolls for proofing. The sheeting operation expels a large portion of the gas in the dough, but the dough is elastic and springy after being sheeted. Heretofore the dough rolls made from sheeted dough strips have passed under a pressure rolling board which is quite rigid and subjects the rolls to a compression rolling. The principal function of the rolling operation is to expel trapped air parallel of the axis of the roll, to consolidate and elongate the roll and to eliminate division lines formed by the surface of the strip as it is rolled. Some attempts have been made to have the pressure board yielding by supporting it with compression springs, and although a large part of the division lines in the roll are eliminated, other parts of the division lines appear in the baked loaf.

I have found that if the pressure imparting surface of the pressure board is composed of a comparatively thick sponge rubber, the yielding body of rubber will effectively act on all portions of the dough to consolidate the roll, remove division lines, and expel gas from the roll. The sponge rubber is effective in acting on all parts of the roll, even though it has an irregular shape, and after a comparatively short distance of rolling, the rolls will emerge with a substantially uniform shape suitable for being deposited in the proofing and baking pans.

Triangular shaped rolling pads which are positioned to have the point of the triangle first contact the dough roll at its center and work the gas toward both ends of the roll have been found to be very satisfactory for pressure rolling. Further the yielding elasticity of the sponge rubber pads allows the pads to be mounted on a rigid surface and avoids the necessity of mounting the board on springs.

The primary object of the present invention is to provide a pressure board for a dough moulding machine which has an elastic yielding surface.

A further object of the invention is to provide a pressure board for a dough moulding machine with thick triangular shaped sponge rubber pads arranged to work gas from the center toward the ends of the dough roll.

With these and other objects in view, the invention consists in the pressure board for a dough moulding machine having elastic compression rubber surfaces as hereinafter illustrated and described, and particularly defined in the appended claims.

The various features of the invention are illustrated in the accompanying drawings, in which:

Fig. 1 is a diagrammatic illustration in side elevation of a pressure board embodying sponge rubber pads of the present invention; and Fig. 2 is a bottom plan view of a dough pressure board showing the mounting of triangular sponge rubber pads on the bottom of the board.

The sponge or foam rubber pads of the present invention may be readily applied to the pressure boards of most of the well-known bread dough moulding machines. Referring to Figs. 1 and 2, the sponge rubber pads 10 and 12 are triangular in shape, and are cemented to the bottom of a pressure board 14. The pressure board is adjustably mounted on bolts 16 at each corner thereof in order to adjust the surface of the pads toward and from the surface of a pressure rolling belt 18. The belt 18 runs between pulleys 20 and 22 and is driven by means of a motor 24 which has a sprocket chain connection with the pulley 20. The belt 18 rides over a platform 26 which rigidly supports the belt so that the dough roll passing between the belt and the pads will be subjected to compression.

Preferably the surface of the rubber pads 10 and 12 is covered with a cotton sheet or fabric which is in the form of a belt 28 which runs between pulleys 30 and 32. The belt 28 is normally held in stationary position by means of a pawl 34 which engages a rack 36 secured to the shaft of the pulley 32. Periodically the pawl may be released from the rack 36 and the belt moved by means of a handle 38 to put new surface of the belt 28 in contact with the dough. Periodically the belt 28 is removed and cleaned to present a clean surface for the moulding operation.

Although two rubber pads are illustrated as being used on the moulding board, it is apparent that one triangular pad might be used in which the point of the pad would correspond to the point of pad 10, and the rear end of the pad would correspond to the rear end of pad 12. In all cases the triangular pads are mounted on the board so that the pointed end is arranged to first contact substantially the center portion of the dough roll to subject the dough roll to a compression which expels gas from the center toward each end of the roll. With the pressure board illustrated in Fig. 2 a board which is 24 inches long will have the first pad approximately 10 inches long with the base of the pad about six inches wide. The second pad will be fourteen inches long and fourteen inches wide at the base. With a twenty-four inch length of rolling of the roll, it is found that the dough roll may be properly consolidated and shaped satisfactorily for panning. With larger loaves of bread, pressure boards of from twenty-four to thirty-six inches long may be used, and one to three pads used in the rolling operation. It has been found that a pad of one and one-half to two inches in thickness gives a very satisfactory rolling operation. The yielding surface of the pad provides for the irregular shape of the dough roll, and thus all parts of the roll are subjected to compression. Furthermore, with the elastic pads the bolts 16 may be adjusted to place considerable compression on the dough and still the belt will effectively roll the dough rolls under the pads.

The preferred form of the invention having been thus described, what is claimed as new is:

1. In a dough moulding machine, a pressure board comprising a rolling belt, a platform for supporting the belt, a pressure board adjustably mounted in a fixed position above the belt, a comparatively thick sponge rubber pad attached to the bottom of the board with its bottom surface spaced from the belt, and means to drive the belt to carry dough rolls under the pad.

2. The pressure board defined in claim 1 in which the sponge rubber pad is composed of a plurality of triangular shaped pads with the points of the triangles positioned to first contact a dough roll as the dough roll is advanced by the belt.

3. The pressure board defined in claim 1 in which the sponge rubber has a thickness of from one and one-half to two inches.

4. The pressure board defined in claim 1 in which two sponge rubber triangular pads are attached to the bottom of the pressure board having a thickness about two inches, the first pad being approximately ten inches long and six inches wide at the rear end, and the second pad being approximately fourteen inches long and fourteen inches wide at the rear end.

5. The pressure board defined in claim 1 in which a cloth sheet is held in contact with the bottom face of the pad so that a dough roll makes direct contact with the cloth.

(References on following page)

References Cited in the file of this patent

UNITED STATES PATENTS

| Number | Name | Date |
|---|---|---|
| Re. 11,751 | Corby et al. | June 20, 1899 |
| 1,667,955 | Smith | May 1, 1928 |
| 1,787,778 | Dell | Jan. 6, 1931 |
| 1,945,073 | Raith | Jan. 30, 1934 |

FOREIGN PATENTS

| Number | Country | Date |
|---|---|---|
| 183,848 | Great Britain | July 26, 1923 |